Oct. 29, 1963    G. F. SERRA ETAL    3,108,473
FLUID STREAM DIRECTION INDICATOR
Filed July 25, 1960    2 Sheets-Sheet 2
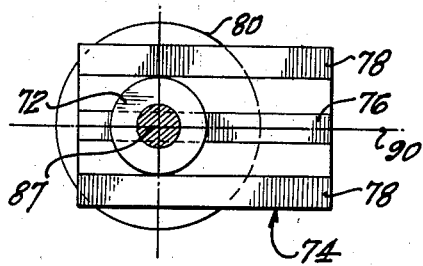
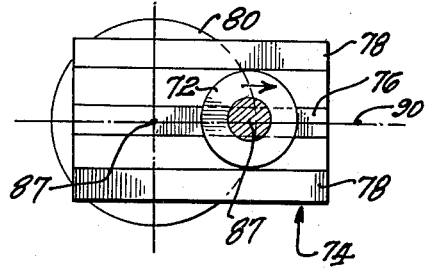
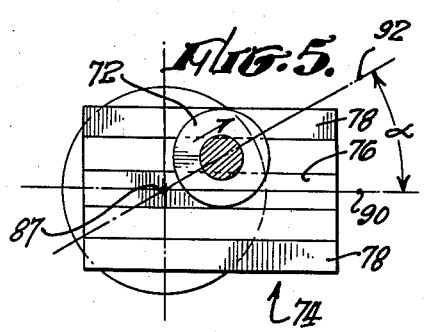
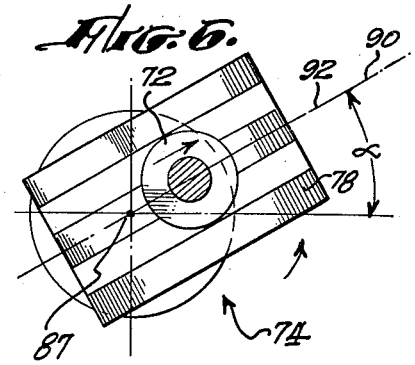
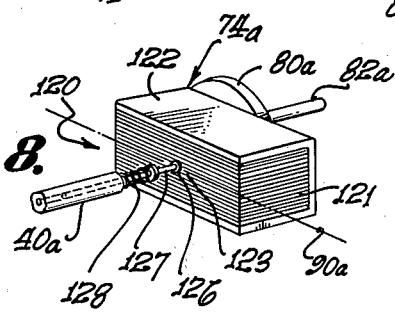
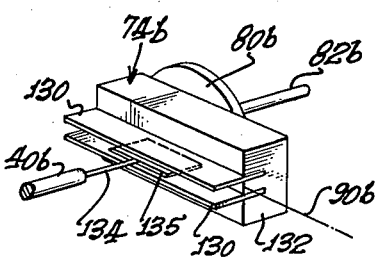
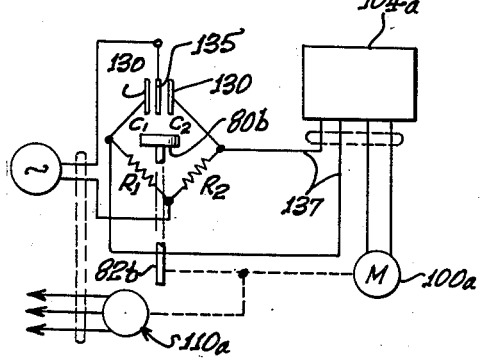
GERALD F. SERRA,
PHILIP E. DARO,
ARTHUR J. BUCHTENKIRCH,
INVENTORS.
BY
Bartholow & Lewis

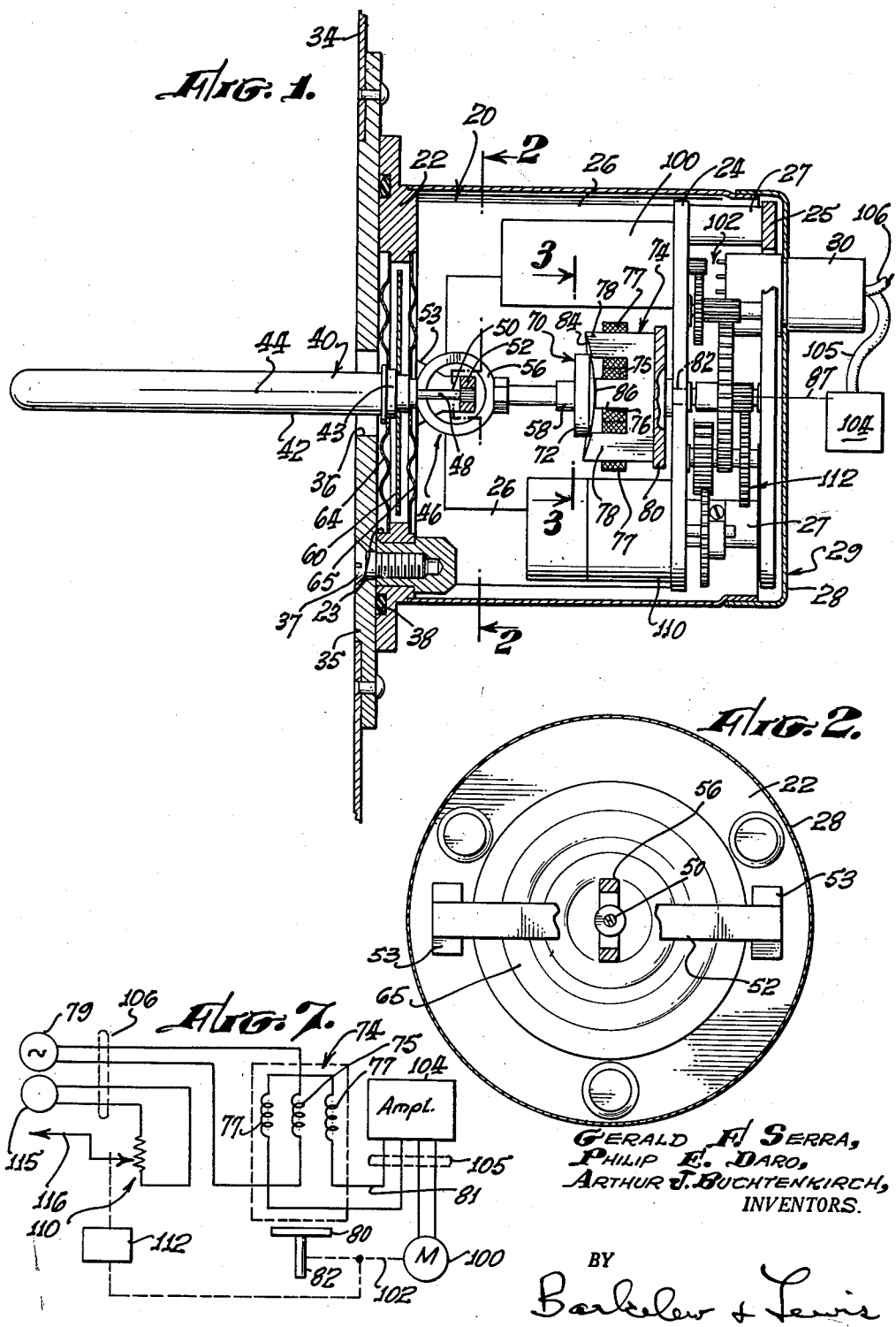

United States Patent Office 3,108,473
Patented Oct. 29, 1963

3,108,473
FLUID STREAM DIRECTION INDICATOR
Gerald F. Serra, Wayne Township, Bergen County, and Philip E. Daro, New Milford, N.J., and Arthur J. Buchtenkirch, Glen Cove, N.Y., assignors to Giannini Controls Corporation, Duarte, Calif., a corporation of New York
Filed July 25, 1960, Ser. No. 45,108
5 Claims. (Cl. 73—188)

This invention has to do with mechanisms for indicating the direction of flow of a fluid stream. Such mechanisms are commonly employed for a wide variety of purposes, relating to streams of liquids as well as gases.

The mechanism of the present invention is particularly useful for indicating the direction of an airstream over the surface of an aircraft in flight, as in an angle of attack or angle of sideslip indicator. For the sake of clarity and definiteness, the invention will be described primarily as it pertains to such use, but without thereby implying any limitation upon its scope.

The present mechanism for indicating the direction of a fluid stream has the great advantage that the sensing element which projects into the fluid stream has no orifices, such as are required, for example in devices that measure angle of attack in terms of pressures at two points of a probe surface.

Moreover, in the present mechanism, the required movement of the sensing element can be accommodated entirely by pivots of flexure type, so that the friction tending to oppose movement of the sensor may be reduced substantially to zero. Furthermore, that movement is of such a type that the pivot bearings of the sensor, as well as all other moving parts, can be hermetically sealed from the fluid stream.

That is in sharp contrast to the previously available airstream direction indicators that utilize a vane or flag rotatably mounted in the airstream. In such devices a partial seal can be provided between the vane itself and the transducer device that detects its movement; but such a bearing seal frictionally opposes the vane movement and requires frequent servicing to maintain even partial effectiveness.

The present invention utilizes as sensing element an axially symmetrical member that is mounted for limited universal pivotal movement with its axis normally extending transversely of the fluid stream. When the device is utilized to indicate the direction of an airstream adjacent a boundary surface, for example a surface of an aircraft, the sensing member is typically mounted with its axis normally perpendicular to that surface. The sensing member is then deflected by the airstream in a plane parallel to the direction of the stream. That deflection constitutes rotation about a deflection axis that is substantially parallel to the boundary surface, rather than perpendicular to that surface as in the previously available vane type of mechanism. That novel mode of sensor movement permits the sensor pivot structure to be housed on the opposite side of the boundary surface from the fluid stream, where it may be fully protected from moisture and dirt. That arrangement has the further advantage, in the case of an aircraft instrument, of greatly facilitating de-icing of the sensing member.

The plane of deflection of the sensing member is detected and translated into an output signal of suitable type by mechanism which may be hermetically sealed from the fluid stream. That mechanism typically comprises an electrical transducer that is responsive only to movement transverse of a neutral plane, and servo follow-up mechanism for rotating the neutral plane of the transducer into alignment with the deflection plane of the sensing member. Output signal means of any desired type may be driven by the servo mechanism in parallel with the transducer rotation.

A full understanding of the invention, and of its further objects and advantages, will be had from the following description of certain illustrative manners of carrying it out. The particulars of that description and of the accompanying drawings which form a part of it are intended only as illustration of the invention, and not as a limitation upon its scope, which is defined in the appended claims.

In the drawings:
FIG. 1 is an axial section of an illustrative airstream direction indicator in accordance with the invention;
FIG. 2 is a section on line 2—2 of FIG. 1;
FIG. 3 is a section on line 3—3 of FIG. 1;
FIGS. 4, 5 and 6 are sections like FIG. 3, illustrating operaiton of the mechanism;
FIG. 7 is a schematic circuit diagram;
FIG. 8 is a schematic perspective illustrating a modification;
FIG. 9 is a schematic perspective illustrating a further modification; and
FIG. 10 is a schematic circuit diagram.

The illustrative embodiment of the invention represented in FIGS. 1 to 7 is particularly useful as an angle of attack indicator for aircraft. It comprises a rigid frame 20 upon which is pivotally mounted the sensing unit 40. Frame 20 includes a circular base plate 22 with central aperture 23. Two spaced mounting plates 24 and 25 are fixedly supported in parallel spaced relation to base plate 22, as by the posts 26 and 27. A protective cover 28, typically of cylindrical form with one end closed, is hermetically sealed to base plate 22 in any suitable manner such as soldering, for example, completes the housing 29. An electrical connector 30 is typically mounted on cover 28.

Frame 20 is mounted with the outer face of base plate 22 parallel to and closely adjacent the outer skin 34 of the aircraft. A mounting ring 35 with central clearance aperture 36 is typically permanently mounted in an opening in the aircraft skin, and frame 20 is releasably secured to ring 35 as by the screws 37, with suitable sealing means such as the O-ring 38.

Sensing unit 40 comprises the sensor element 42, which is mounted on the hub 43 and is axially symmetrical about the sensor axis 44. Also mounted on hub 43 and forming part of the sensing unit is one element 72 of the transducer 70, to be described. Sensing unit 40 is pivotally mounted on frame 20, as by the pivot structure indicated generally at 46, for limited universal pivotal movement with respect to the frame about a definite center of rotation. That center lies on axis 44 and is indicated at 48. Sensing unit 40 is resiliently urged toward a normal equilibrium position, typically that shown in FIGS. 1 and 3, wherein sensor 42 extends substantially perpendicularly beyond the aircraft surface 34 into the airstream to be sensed. The airstream flowing parallel to surface 34 then exerts a transverse drag on sensor 42, tending to deflect the entire unit 40 about point 48 in a plane parallel to the stream direction. Pivot structure 46 is described as "universal" in the present specification and claims in the sense of permitting swinging movement of the sensor about point 48 in any arbitrary axial plane, at least within the range of azimuths in which angle indication is required.

Universal pivot structure 46 may be of any suitable type, but is preferably a flexure pivot. Frictional resistance to deflection of sensor 42 is then reduced substantially to zero. The illustrative pivot structure shown comprises a cylindrical rod 50 of suitable resilient material such as beryllium copper, for example. One end of the rod is fixedly mounted on a supporting saddle 52, which is rigidly mounted on base plate 22 by means of the struts 53, and extends diametrically across aperture 23. The other end of flexure rod 50 fixedly carries hub 43 of the sensing unit.

In normal position of sensing unit 40, flexure rod 50 is straight and coaxial with sensor axis 44. Bending of the rod yieldingly permits limited universal pivotal movement of the sensor about the effective center 48. In practice the airstream deflects the sensor unit until the drag exerted on the sensor is balanced by the resilient restoring force developed by rod 50. The magnitude of the restoring force increases substantially linearly with the deflection angle, the rate of increase being controllable by suitable detailed selection of such factors as the dimensions and material of rod 50.

An important advantage of the present pivot structure is its inherent axial symmetry, which makes the restoring force independent of the direction of deflection. The plane of the deflection movement therefore corresponds accurately to the direction of the airstream, being defined by that direction and the normal or equilibrium position of sensor axis 44.

Transducer element 72 is mounted on hub 43 by means of a yoke structure 56, which spacedly surrounds saddle 52 with sufficient clearance to permit the full desired range of deflection of flexure rod 50. During such deflection, yoke 56 maintains transducer element 72 strictly coaxial with sensor axis 44. Suitable static and dynamic balance of sensing unit 40 about point 48 is provided, as by the counterweight 58. Although flexure rod 50 may be quite flexible in torsion, any torsional deflection that may occur does not affect operation of the present structure; and since the torsional forces actually existing are negligibly small in practice, the suspension is in full effect torsionally rigid.

The described deflection movement of sensing unit 40 is preferably damped, primarily to prevent excessive oscillation in the presence of vibration close to the natural frequency of the suspension, which is typically of the order of 80 cycles per second. In the present system, a rigid disk 60 is mounted on hub 43 and is immersed in a suitable damping fluid such as the well known silicon fluids, for example. That fluid is contained in a chamber formed by frame aperture 23 and two highly flexible annular diaphragms 64 and 65. Those diaphragms are mounted in hermetically sealed relation on hub 43 and the wall of aperture 23. The diaphragms are typically formed of deeply convoluted flexible metal, as shown, but may be of non-metallic flexible material such as neoprene of "Teflon," for example. The damping action of disk 60 is preferably adjusted to provide at least critical damping of the suspension over the operating temperature range of the instrument.

Diaphragms 64 and 65 typically add only negligible restoring force with respect to swinging movement of the sensing unit about point 48. On the other hand, if preferred, the diaphragms may be designed to add an appreciable amount of restoring force to the suspension. In fact, that restoring force may be made sufficient by itself to provide the desired stiffness and definition. Saddle 52 may then be omitted entirely. Rear diaphragm 65, for example, can be viewed as constituting an illustrative flexure pivot of diaphragm type, while forward diaphragm 64 remains highly flexible. An advantage of utilizing flexure structure of that type is that the restoring force may be made a non-linear function of deflection, while maintaining axial symmetry. The sensor may then be made relatively sensitive at low deflection angles, corresponding to low air speeds, while avoiding excessive deflection at high airspeeds.

Deflection of sensing unit 40 about point 48 in response to the airstream is detected by means now to be described. An important characteristic of that detection system is that the direction of the sensor deflection is not computed from two separately measured components; but is measured directly. That is accomplished by means of a transducer that freely permits universal swinging movement of the sensing unit but develops a signal only in response to one component of that movement. The transducer is unresponsive to sensor deflection in a plane perpendicular to that component. The latter plane will be referred to as the neutral plane of the transducer. The transducer typically comprises two cooperating elements, a moving element mounted on sensing unit 40 for movement therewith, and a relatively fixed element which is mounted on frame 20. The neutral plane of the transducer is defined by the structure of one of the transducer elements, and is rotatable about axis 44 by bodily rotation of that element. The other element may be correspondingly rotated, if desired, but that is not ordinarily necessary. Rotation of the neutral plane is typically driven automatically by means of a servo drive under control of the output signal from the transducer.

With such arrangement, if the sensor deflection has a component perpendicular to the neutral plane of the transducer, a signal is produced which represents that component. That signal causes the servo mechanism to rotate the driven element of the transducer in a direction to align the neutral plane of the transducer with the existing deflection. Once such alignment is attained, the transducer becomes unresponsive, the signal goes to zero and the drive stops. The rotary position of the driven element of the transducer then corresponds to the direction of sensor deflection, and provides a direct measure of the direction of the fluid stream.

In the present preferred embodiment only one of the two transducer elements is servo-driven, and the element thus driven is the relatively fixed element that does not share the sensor deflection. That has the great advantage that pivot structure 46 may be carried on a rigid support 52, rather than on a rotatable support. The present arrangement further permits hermetic sealing of the front wall of the housing, as at plate 22.

The illustrative transducer shown in FIGS. 1 to 7 is an electromagnetic device somewhat similar to a conventional E-core differential transformer. The relatively fixed element 74 comprises an E-core made up of flat E-shaped laminations of magnetically permeable material such as iron. A primary or excitation winding 75 is placed on the center leg 76 of the E, and is supplied with alternating current via flexible connections from any suitable source 79 (FIG. 7). Two secondary windings 77 are placed on the respective end legs 78. The two secondary windings are connected in the transducer output circuit 81 in series opposition. Element 74 is mounted for rotation about an axis 87, which coincides with sensor axis 44 in normal position of the latter. As shown, a shaft 82 is journaled on axis 87 on the plates 24 and 25, and fixedly carries a support 80 of disk form. Transducer element 74 is mounted on support 80 with the pole faces of the E-core, which comprise the working face 84 of the transducer element, facing axially toward sensing unit 40.

An armature of magnetically permeable material is mounted on sensing unit 40 and constitutes the relatively movable element 72 of the transducer. Armature 72 has its working face 86 closely spaced from that of the E-core, that space being exaggerated in FIG. 1 for clarity of illustration. The two opposed working faces 84 and 86 are preferably curved approximately spherically about point 48 as a center. The width of the air gap between them is then substantially independent of swinging movement of sensing unit 40. The armature completes the magnetic flux paths between the primary and the two secondary windings on the E-core. When the armature is exactly centered with respect to the magnetic plane of symmetry 90 of the E, as seen in FIG. 3, for example, the reluctance is equal between the primary and each of the secondary windings. The voltages induced therein are then equal, and the magnetic bridge is balanced. Since the windings are connected in series opposed, the net output signal at 81 is zero.

Deflection of armature 72 parallel to plane 90, for example as in FIG. 4, does not disturb that symmetry. Hence the signal remains zero, and the plane 90 constitutes a neutral plane of the transducer. On the other hand, armature deflection in any other direction, for example in the axial plane represented at 92 in FIG. 5, increases the reluctance of one magnetic circuit and decreases that of the other. The resulting unbalance of magnetic flux in the bridge produces a net alternating current signal in the output circuit which is either in phase with the exciting current or in opposite phase, depending upon the sense of the movement with respect to neutral plane 90.

A servo drive system is provided for driving the rotation of support disk 80 under control of the transducer signal. As shown, that servo system comprises the servo motor 100 mounted on plate 24 and coupled to shaft 82 via the speed-reducing gear train 102. Motor 100 is energized by output power from a servo amplifier, represented schematically at 104. Amplifier 104, which may be of conventional type, typically receives as input signal the voltage from the series-connected secondary windings 77. The detailed wiring connections are omitted in FIG. 1 for clarity of illustration. Amplifier 104 discriminates the phase of the control signal in known manner; and is arranged to drive support 80 and transducer element 74 in a direction to align neutral plane 90 with the actual plane of sensor deflection 92. For example, with the parts as shown in FIG. 5, element 74 is driven counterclockwise about axis 87. That drive continues through the angle $\alpha$, bringing neutral plane 90 into alignment with the deflection plane 92, as shown in FIG. 6. Armature 72 is then again in the neutral plane of the transducer. The magnetic bridge is thereby rebalanced, returning the servo control signal to zero and stopping the drive.

A final output signal of any desired type representing the existing fluid stream direction can be derived by suitable mechanism driven by motor 100 in accordance with the movement of shaft 82. Such mechanism is indicated schematically in FIG. 1 at 110, and is typically coupled by the amplifying gear train 112 to shaft 82 and hence also to motor 100. Signal mechanism 110 may comprise a synchro or a digital encoder, for example, or simply an output shaft. It is illustratively shown in FIG. 7 as a potentiometer with its winding energized from a suitable source 115 of direct or alternating current power. The potentiometer brush is driven by gear train 112 and taps on the line 116 an output voltage signal that corresponds to the rotary position of shaft 82. In null position of the servo drive, that signal represents the angle $\alpha$ of deflection plane 92 with respect to some predetermined zero position, and hence provides a measure of the airstream direction.

Amplifier 104 is shown remote from housing 29, to which it is connected by a cable 105, but may be mounted within that housing if preferred. The power input leads and output signal line 116 may form a cable 106.

Electromagnetic transducers, of which the transducer described above is illustrative, typically have the advantage that no actual contact is required between the two elements, thus avoiding frictional resistance to the swinging movement of the sensing unit. FIGS. 8 and 9 are illustrative of the wide variety of transducer structures that may be employed. FIG. 8 represents a potentiometer 120 with its winding 121 mounted in a frame 122 which is carried on a support 80a. Support 80a corresponds to the support 80 of the previously described embodiment. It is mounted on the servo driven shaft 82a. Potentiometer winding 121 has a working face 123 which is perpendicular to the axis of shaft 82a. The winding is energized in the usual way from an electrical power source, now shown.

The potentiometer brush 126 is mounted coaxially of the sensing element indicated at 40a. The brush typically has a spherical working face and is mounted on one end of a rod 127. The other end of the rod is slidingly received in an axial bore in the sensing unit, and is resiliently urged into light contact with winding face 123 by a coil spring 128. The brush is thus movable over the winding in response to sensing element deflection. Brush movement parallel to the individual turns of the winding, for example along the line 90a of FIG. 8, causes the voltage signal tapped by the brush to change by only the voltage drop along the winding turn. That change is small compared to the voltage difference between adjacent turns. Line 90a thus defines in full effect a neutral plane of the transducer, corresponding to neutral plane 90 of the previous embodiment. Brush deflection transverse of line 90a produces an appreciable control signal, which is utilized to drive shaft 82a as already described in connection with shaft 82.

FIG. 9 represents schematically a transducer of capacitive type, which may embody also a contact that produces an on-off signal rather than a signal of variable magnitude proportional to the deflection. Transducer element 74b comprises two spaced parallel plates 130, mounted on the insulating block 132 which is carried by rotatable support 80b on shaft 82b. The plane midway between plates 130 is parallel to shaft 82b and defines the neutral plane of the transducer, indicated schematically at 90b. The movable transducer element comprises a flexible finger 134, coaxially mounted on sensing unit 40b. Finger 134 carries a conductive plate 135, which is received between plates 130 and is normally spaced from both plates. Plate 135 forms with the two plates 130 respective capacitance elements whose values C1 and C2 are equal when plate 135 is in equilibrium position of neutral plane 90b. Capacitance elements C1 and C2 are typically connected in a bridge network comprising two equal resistances R1 and R2, as shown schematically in FIG. 10. Alternating current power is supplied to the bridge from a suitable source 79a; and the output signal is supplied as control signal to the servo amplifier 104a via the lines 137. Servo motor 100a drives shaft 82b under control of the amplifier. Any lateral deflection of plate 135 from neutral plane 90b causes a corresponding difference between capacitance values C1 and C2, unbalancing the bridge. The resulting proportional signal drives shaft 82b in a direction to align neutral plane 90b with the actual deflection plane.

Electrical contact between the condenser plates may be prevented, as by suitable insulative coatings, for example. Alternatively, such electrical contact in response to large lateral deflections of the sensor element may be employed to provide a relatively large input signal to amplifier 104a to drive motor 100a at maximum speed. The resulting combination of substantially proportional drive at low deflections under capacitive control and positive drive at larger deflections under direct contact control provides particularly effective servo action. If proportional drive is not required, plate 135 may be replaced by a simple contact element which is normally closely spaced from plates 130. Amplifier 104a may then be of a particularly simple type, or may even be omitted and motor 100a controlled directly by switching action of the contact element in known manner.

We claim:

1. Means responsive to the direction of a fluid stream adjacent a boundary surface, comprising the combination of structure forming a housing having an apertured wall substantially coinciding with the surface, a sensor supported within the housing for limited universal pivotal movement, said sensor including an axially symmetrical sensing portion that extends through the aperture into the fluid stream, the sensing portion having a normal position transverse of the stream and being deflectable therefrom in the direction of the stream, transducer means rotatably mounted within the housing and acting in response to sensor movement to produce a signal that represents the rotational position of the transducer means with respect to the direction of deflection of the sensor, means for rotating the transducer means under control of the signal to align the transducer means with the direction of deflection of the sensor, and means for producing an output indication corresponding to the rotary position of the transducer means.

2. The combination set forth in claim 1, and including also two mutually spaced flexible annular diaphragms having their inner and outer peripheries mounted respectively on the sensor and on the housing wall, and forming a hermetically sealed damping chamber that contains a damping fluid, and a damping member fixedly mounted on the sensor and engaging the damping fluid.

3. Means responsive to the direction of a fluid stream and comprising in combination an axially symmetrical sensor mounted for limited universal pivotal movement about a point on the sensor axis, the sensor having a normal position in which the axis is transverse of the stream direction and being deflectable from that position in a plane parallel to the stream direction, a support rotatable about a support axis that passes through said point, a differential transformer comprising an E-core mounted on the support and an axially symmetrical armature coaxially mounted on the sensor, the differential transformer being unresponsive to armature movement parallel to the plane of magnetic symmetry and producing a signal in response to armature movement transverse of that plane, servo means for driving the support about the support axis under control of said signal to align the plane of magnetic symmetry with the plane of sensor deflection, and means for producing an output indication corresponding to the position of the support.

4. The combination set forth in claim 3, and wherein the armature and the E-core have respective closely spaced working faces that are spherically curved about said point.

5. Means responsive to the direction of a fluid stream moving along a surface, comprising in combination an elongated axially symmetrical sensor mounted for limited universal pivotal movement about a point adjacent the surface, said sensor normally extending transversely of the surface and being deflectable by the stream in a direction generally parallel to the stream movement, a support rotatable about a support axis generally parallel to the length of the sensor in normal position thereof, transducer means comprising two cooperating elements, one element being mounted on the sensor and one element being mounted on the support, said support-mounted element including structure defining a diametral plane through the support axis, the transducer means being unresponsive to sensor movement parallel to said diametral plane and developing a signal responsive to sensor movement transversely of said diametral plane, servo means for driving the support about the support axis under control of the signal to align the diametral plane with the direction of the sensor deflection, and means for producing an output indication corresponding to the position of the support.

References Cited in the file of this patent

UNITED STATES PATENTS

| | | |
|---|---|---|
| 2,699,065 | Blair | Jan. 11, 1955 |
| 2,780,937 | Haynes et al. | Feb. 12, 1957 |